3,734,959
CATALYTIC PROCESS FOR PRODUCING PHTHALOYL CHLORIDES
Charles Frank Hauser, Charleston, W. Va., and John Wendell Lynn, Westfield, N.J., assignors to Union Carbide Corporation, New York, N.Y.
No Drawing. Filed Apr. 7, 1972, Ser. No. 242,242
Int. Cl. C07c 63/24, 63/30
U.S. Cl. 260—544 M                                    6 Claims

ABSTRACT OF THE DISCLOSURE

The catalytic activity of ferric chloride is maintained or restored by the addition of an oxidant such as chlorine, ammonium persulfate or peracetic acid to the reaction mixture of phthaloyl chloride, carbon tetrachloride and catalyst.

BACKGROUND OF THE INVENTION

Phthaloyl chlorides have been produced by the reaction of a suitable carboxylic acid or carboxylic acid anhydride was carbon tetrachloride using ferric chloride as the catalyst. This procedure is described in U.S. Pat. No. 3,449,416. One of the problems associated with this method is the decline in the catalytic activity of the ferric chloride as the process progresses. The problem has been overcome to some extent by the continual addition of further quantities of ferric chloride but even with this expedient incomplete reactions and low yields are often encountered.

DESCRIPTION OF THE INVENTION

It has now been found that the catalytic reaction process described can be carried out and maintained without further addition of catalyst by the addition to the reaction mixture of an oxidant which will maintain the valence of the iron atom at a value of plus three. It was found that the activity of the ferric chloride decreased as the valence of the iron changed during the reaction from three to two and that this activity could be restored or maintained by having present in the reaction mixture an oxidant of sufficient strength to maintain the valence of the iron atom at three and thus continue to maintain the phthaloyl chloride conversion in the reaction mixture. Any oxidant material of sufficient oxidative strength can be used that will not interfere with the major reaction being carried out and many such compounds are known to those skilled in the art.

DISCLOSURE OF THE INVENTION

In the process of this invention a phthaloyl acid, such as isophthalic acid or terephthalic acid, is reacted with carbon tetrachloride using ferric chloride as the catalyst. It has now been found that the addition of chlorine, ammonium persulfate, or any other suitable oxidant will maintain the activity of the catalyst and result in high yields and conversions of the phthaloyl acid to the acid chloride. In the absence of the oxidant either a low conversion or loss due to polymerization or both are usually encountered.

The oxidant can be added to the reaction mixture at the start of the reaction or it can be introduced during the reaction at any time desired. The oxidant is present at a concentration of 0.1 to 10 mole percent based on the moles of phthaloyl acid in the mixture. Illustrative of suitable oxidants one can mention chlorine, ammonium persulfate, peracetic acid, potassium permanganate, bromine, perbenzoic acid, and the like.

Ferric chloride is the effective catalyst for catalyzing the reaction between the carboxylic acid and carbon tetrachloride. Thus, the iron catalysts suitable for use in the process of this invention are ferric chloride and iron compounds capable of generating ferric chloride in situ, i.e., iron compounds capable of forming ferric chloride under the reaction conditions of process. Illustrative of such iron compounds one can mention ferric oxide, ferrous oxide, ferric hydroxide, ferrous hydroxide, ferric nitrate, ferrous nitrate, ferric acetate, ferrous acetate, ferric oxalate, ferrous oxalate, ferric bromide, ferrous bromide, metallic iron, and ferric chelates such as ferric acetonylacetonate. It is preferred to employ ferric chloride as the catalyst. Other compounds commonly exhibiting catalytic properties similar to those of ferric chloride have been found to lack the necessary catalytic activity required to effectively promote the reaction to the desired high yield of acid halide; also, many of those listed above lose their initial efficiency and result in incomplete reaction or low yield unless the oxidant is present in the reaction mixture.

The concentration of the ferric chloride in the reaction mixture can be any catalytic amount, by this term is meant that quantity which will effectively catalyze the reatcion between the carboxylic acid or acid anhydride and the halocarbon to give the desired acid halide in high yields. In general, it has been found that a catalyst concentration, based on the weight of the carboxylic acid or acid anhydride, of from about 0.5 to about 10 percent, and more preferably from about 1 to about 4 percent, is satisfactory. Catalyst concentrations above and below the aforementioned broad range can also be employed but are less preferred. If desired, and depending upon the manner in which the reaction is carried out, the catalyst can be employed on an inert carrier, such as a molecular sieve, or other porous material.

The ratio of carbon tetrachloride to carboxylic acid can vary as is known to those skilled in the art. Sufficient carbon tetrachloride should be added to provide a stoichiometric amount. With a dicarboxylic acid a stoichiometric amount is two moles of carbon tetrachloride per mole of dicarboxylic acid. An excess can be used if desired and this excess can be as much as ten times the theoretical amount required for the reaction.

The process of this invention can be carried out in the presence of a solvent or in the absence of a solvent. A variety of inert organic solvents can optionally be employed as diluents in the practice of the instant process, i.e., saturated aliphatic hydrocarbons, aromatic hydrocarbons, saturated aliphatic ethers, saturated cycloaliphatic ethers, and halogen substituted saturated aliphatic hydrocarbons. The presence of a solvent is most desirable, although not essential, to control the reaction where a batch process is employed. However, the use of a large excess of carbon tetrachloride in most instances circumvents the need for a separate solvent. Carbon tetrachloride is inert to the acid chlorides and serves both as reactant and solvent. The amount of solvent present can vary within wide limits, and while amounts up to about ten percent by volume of the total charge are usually preferred, amounts in excess of this can be employed. Thus, this limit is one of economic practicability. It is noted that the amount of diluent employed will also vary with the particular reactants and the manner in which the process is conducted.

The improved process of the present invention can be conducted in either the liquid or vaporous phase. Moreover, the process can be effected in either a batch or continuous manner. For example, the reactants can be fed continuously to a stainless steel tubular reactor containing the iron catalyst on an inert support which is equipped with the necessary temperature and pressure controls. The desired residence time can be conveniently achieved by controlling the rate of flow of the reactants through the reactor.

Pressure is not necessarily critical and the reaction can be effected at atmospheric, subatmospheric, or superatmospheric pressures. For example, it was observed that a suitable pressure range is from about atmospheric to about 1,000 pounds per square inch; the preferred pressure range is from about atmospheric to about 300 pounds per square inch.

The temperature can range from about 50° C. to about 350° C. The preferred temperature is from about 150° C. to about 185° C. The use of the oxidants in accordance with this invention permits the maintenance of catalyst activities at temperatures below 185° C. and thus minimizes the corrosion problems and structural problems observed at the higher temperatures.

Reaction times of from several seconds to twelve hours or more are thoroughly practicable, with the preferred range being from one minute to about five hours. Shorter or longer periods can also be feasibly employed depending upon the temperature (higher temperatures usually permit the use of shorter reaction times), the carboxylic acid or acid anhydride used, and the manner in which the process is conducted, i.e., batchwise or continuous process. Of course, the size of the run is the major factor affecting time.

The following examples serve to illustrate the invention.

Example I

A three necked two liter round bottom flask was fitted with a stirrer, a thermometer, an addition funnel equipped with a stirrer and a distillation column capped by a total reflux distillation head. The flask was charged with 100 grams of a terephthalic chloride "heel" from a previous reaction and 3.34 grams of ferric chloride were added. To this mixture there was added a slurry of a mixture of 2.1 moles of carbon tetrachloride and 1 mole of terephthalic acid at a temperature of about 175° C. The slurry was fed incrementally to the flask at such a rate that the reaction temperature was maintained at 175° C. to 180° C. The carbon tetrachloride fed with each increment flashed away from the hot reaction mixture but was allowed to reflux in the distillation column and total reflux distillation head and return to the flask for use in the reaction. The phosgene and hydrogen chloride by-products were permitted to distill out of the system and were removed. As the catalyst activity began to fail, the slurry feed was stopped and gaseous chlorine and carbon tetrachloride were added incrementally until the original color of the reaction mixture was restored and no more phosgene was evolved at the reaction temperature during continuous carbon tetrachloride reflux. At that point, the slurry feed was started again and the reaction continued as before. This procedure of alternating slurry feed and oxidant feed was followed until all of the slurry had been fed and there was no further evolution of phosgene at the reaction temperature. The total time required for the addition of the 978 grams of slurry feed containing the terephthalic acid and carbon tetrachloride to the reaction flask was 23 hours. Chloride additions were made the first time six hours after the reaction had been started and 175 ml. of the slurry feed had been added and the second time thirteen hours after the reaction had been started and 335 ml. of the slurry feed had been added to the reaction.

Upon the completion of the reaction, as evidenced by the fact that there was no further evolution of phosgene, the reaction mixture was distilled at a pressure 10 mm. of mercury and a temperature of 100° C. to 130° C. to remove volatiles. The residue was then fractionally distilled at a pressure 3.5 to 4.0 mm. of mercury through a one inch glass helix packed column and there was recovered 378 grams of terephthaloyl chloride having a melting point of 81.45° C. at an efficiency of 80.8 percent.

Example II

In a manner similar to that described in Example I, terephthalic acid was converted to terephthaloyl chloride using 0.5 mole percent ferric chloride based on the terephthalic acid as the catalyst. The reaction was carried out over a period of 48 hours at 175° C. to 185° C. during which time there were charged a total 498 grams of terephthalic acid and 970 grams of carbon tetrachloride as a slurry. The chlorine was bubbled through the reaction mixture whenever the catalyst activity began to fail. The time at which the chlorine was bubbled in and the amounts of additional carbon tetrachloride added are set further in the table below.

| Time of chlorine additions after start of reaction, hours: | Total carbon tetrachloride/tetraphthalic acid slurry added, ml. |
|---|---|
| 8 | 175 |
| 16 | 405 |
| 26 | 650 |
| 40 | 850 |
| 46 | 940 |

The terephthaloyl chloride was recovered as described in Example I. It had a melting point of 81.4° C. to 81.6° C. and the efficiency of the reaction was 95.5 percent. The yield was 5.71 grams.

Example III

Following the procedures and using the apparatus described in Example I, terephthaloyl chloride was produced by the reaction of terephthalic acid and carbon tetrachloride. In this example there was initially fed to the reaction flask one mole percent, based on the terephthalic acid, of ammonium persulfate. During this reaction the temperature was maintained at 175° C. to 180° C. and there was added a slurry containing a total of 2 moles of terephthalic acid and 4.2 moles of carbon tetrachloride. The activity of the catalytic reaction never failed during the 22 hours required for the incremental addition of the terephthalic acid/carbon tetrachloride slurry. There was obtained 333 grams of high purity terephthaloyl chloride having a meltpoint of 81.5° C. to 81.6° C. at an efficiency of 85.9 percent. The product was recovered in the manner described in Example I.

For comparison purposes the reaction was repeated in the same manner but without the addition of any ammonium persulfate. The reaction mixture became inactive and the reaction stopped after approximately one quarter of the terephthalic acid had been converted to the terephthaloyl chloride. This indicated the important role that the ammonium persulfate oxidant plays in maintaining the catalytic activity of the ferric chloride catalyst.

Example IV

Following the procedure similar to that described in Example III, an attempt was made to react terephthalic acid with carbon tetrachloride in the presence of one mole percent ferrous chloride as the catalyst. No reaction was observed over a period of 2.5 hours at a temperature of 178° C. to 188° C.

At the end of this 2.5 hour period one mole percent of ammonium persulfate, based on the terephthalic acid, was added to the mixture in the reaction flask to oxidize the ferrous chloride to ferric chloride. The reaction commenced and was continued at 178° C. to 183° C. with conversion of the terephthalic acid to high purity terephthaloyl chloride at an efficiency of 85.1 percent. The terephthaloyl chloride was recovered as described in Example I, it had a melting point of 81.6° C. and the yield was 340 grams.

In order to determine whether or not ammonium persulfate itself was a catalyst, a reaction mixture was prepared in which the ferric chloride catalyst was omitted but which contained one mole percent ammonium persulfate. No reaction was observed during a period of four hours at 180° C. This established that ammonium persulfate is not the catalyst.

Example V

Following the procedures and using the apparatus described in Example I, isophthaloyl chloride was produced by the reaction of isophthalic acid with carbon tetrachloride. In this example there was initially fed to the reaction flask one mole percent, based upon isophthalic acid, of ammonium persulfate. During this reaction the temperature was maintained at 175° C. to 180° C. and there was added a slurry containing a total of 2 moles of isophthalic acid and 4.2 moles of carbon tetrachloride. The reaction proceeded smoothly, with no indication of catalyst deactivation or polymeric residues building up in the reaction flask. There was obtained, after a 20 hour reaction period, 396 grams of high purity isophthaloyl chloride having a melting point of 43.4° C. to 43.5° C. at an efficiency of 98.5 percent. The product was recovered in the manner described in Example I.

For comparison purposes, the reaction was repeated in the same manner but without the addition of any ammonium persulfate. The reaction mixture never became totally inactive, but the reaction required 30 hours for completion and considerable product was lost to polymeric residues. Only 312 grams of isophthaloyl chloride could be isolated in 80 percent efficiency. Although the preparation of isophthaloyl chloride is not as subject to catalyst deactivation as is terephthaloyl chloride, the considerable difference in yield and the loss of product to polymer residue shows the importance of having an oxidation material in the reaction mixture as discovered by this invention.

What is claimed is:

1. In a process for the preparation of terephthaloyl chloride or isophthaloyl chloride which comprises contacting said terephthalic acid or isophthalic acid with carbon tetrachloride in the presence of a catalytic amount of ferric chloride, the improvement of having present in said process mixture an oxidant to maintain the valence of the iron atom at valence of 3.

2. In a process as claimed in claim 1, the improvement wherein said oxidant is chlorine.

3. In a process as claimed in claim 1, the improvement wherein said oxidant is ammonium persulfate.

4. In a process as claimed in claim 1, wherein an inert organic solvent is present.

5. In a process as claimed in claim 1, wherein terephthalic acid is converted to terephthaloyl chloride.

6. In a process as claimed in claim 1, wherein isophthalic acid is converted to isophthaloyl chloride.

References Cited

UNITED STATES PATENTS 3,364,254   1/1968   Scigliano et al. ____ 260—544 M
2,449,416   6/1969   Brothertas _____ 260—544 M LORRAINE A. WEINBERGER, Primary Examiner R. D. KELLY, Assistant Examiner